US010891260B2

(12) United States Patent
Rudge et al.

(10) Patent No.: US 10,891,260 B2
(45) Date of Patent: *Jan. 12, 2021

(54) METHODS AND SYSTEMS FOR EVENT BASED NOTIFICATIONS

(71) Applicant: RMC PHARMACEUTICAL SOLUTIONS, INC., Longmont, CO (US)

(72) Inventors: Scott Rudge, Longmont, CO (US); Korben Knudson, Denver, CO (US)

(73) Assignee: RMC PHARMACEUTICAL SOLUTIONS, INC., Longmont, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/428,392

(22) Filed: May 31, 2019

(65) Prior Publication Data

US 2019/0286616 A1  Sep. 19, 2019

Related U.S. Application Data

(63) Continuation of application No. 15/993,101, filed on May 30, 2018, now Pat. No. 10,353,868, which is a
(Continued)

(51) Int. Cl.
*G06F 15/16* (2006.01)
*G06F 16/17* (2019.01)
(Continued)

(52) U.S. Cl.
CPC .......... *G06F 16/1734* (2019.01); *G06F 9/542* (2013.01); *G06F 11/302* (2013.01);
(Continued)

(58) Field of Classification Search
CPC ............. G06F 11/3013; G06F 11/3055; G06F 11/324; G06F 11/326; H04W 24/00; H04W 68/00; H04W 74/06; H04W 8/18; H04W 8/20; H04M 15/00; H04M 15/83; H04M 15/84; H04M 15/844; H04M 15/85; H04M 15/855; H04M 15/856; H04M 2203/1016; H04M 2207/18; H04M 3/42
(Continued)

(56) References Cited

U.S. PATENT DOCUMENTS 5,482,700 A * 1/1996 Deutsch ................ C07C 243/00
424/9.364
5,693,309 A * 12/1997 Deutsch ................ C07C 243/00
424/9.364
(Continued)

OTHER PUBLICATIONS

Non Final Rejection dated Nov. 30, 2017 by the USPTO for U.S. Appl. No. 15/581,874, filed Apr. 28, 2017 and published as US 2018/0146347 A1 on May 24, 2018 (Inventor—Scott Rudge) (6 Pages).
(Continued)

*Primary Examiner* — Nathan S Taylor
(74) *Attorney, Agent, or Firm* — Ballard Spahr LLP

(57) ABSTRACT

Methods and systems are disclosed for analyzing equipment data, determining an occurrence of an event, and transmitting a message based on the event.

20 Claims, 11 Drawing Sheets

Related U.S. Application Data continuation-in-part of application No. 15/581,874, filed on Apr. 28, 2017, now abandoned.

(60) Provisional application No. 62/320,782, filed on Apr. 11, 2016.

(51) Int. Cl.
    *G06F 9/54* (2006.01)
    *G06F 11/30* (2006.01)
    *G06F 16/13* (2019.01)
    *H04L 29/08* (2006.01)
    *H04W 4/12* (2009.01)

(52) U.S. Cl.
    CPC ...... *G06F 11/3051* (2013.01); *G06F 11/3089* (2013.01); *G06F 16/13* (2019.01); *H04L 67/30* (2013.01); *H04W 4/12* (2013.01); *G06F 2201/865* (2013.01); *H04L 67/1097* (2013.01)

(58) Field of Classification Search
    USPC .................................................. 455/405, 410
    See application file for complete search history.

(56) References Cited

U.S. PATENT DOCUMENTS

| | | | | |
|---|---|---|---|---|
| 6,414,595 B1* | 7/2002 | Scrandis | ............. | H04L 41/0631 340/3.43 |
| 6,591,094 B1* | 7/2003 | Bentley | ............... | B60R 25/1004 455/405 |
| 6,646,564 B1* | 11/2003 | Azieres | ................. | G08B 25/14 340/506 |
| 8,255,358 B2* | 8/2012 | Ballew | ................... | G06Q 10/10 340/679 |
| 10,353,868 B2 | 7/2019 | Rudge et al. | | |
| 2004/0095237 A1* | 5/2004 | Chen | ................... | G06F 11/0748 340/506 |
| 2005/0271037 A1* | 12/2005 | Habaguchi | .......... | H04L 12/1881 370/351 |
| 2009/0289788 A1* | 11/2009 | Leblond | ................. | H04N 7/181 340/540 |
| 2010/0185416 A1* | 7/2010 | Furem | ................... | E02F 9/2054 702/184 |
| 2011/0087984 A1* | 4/2011 | Jitkoff | ................... | G06F 3/0486 715/769 |
| 2011/0130916 A1* | 6/2011 | Mayer | .................... | G07C 5/008 701/31.4 |
| 2011/0154223 A1* | 6/2011 | Whitnah | ................ | G06Q 10/10 715/753 |
| 2012/0314620 A1* | 12/2012 | Ralston | ................. | H04W 24/02 370/254 |
| 2013/0073605 A1* | 3/2013 | Fosburgh | ............ | G06F 11/3013 709/202 |
| 2013/0331992 A1* | 12/2013 | Subramaniam | ........... | B24B 5/04 700/266 |
| 2014/0266755 A1* | 9/2014 | Arensmeier | ........... | G05B 15/02 340/679 |
| 2016/0012707 A1* | 1/2016 | McKinley | .............. | G08B 25/10 340/679 |
| 2017/0124845 A1* | 5/2017 | Potyrailo | ........... | G06K 19/0707 |
| 2018/0001184 A1* | 1/2018 | Tran | ..................... | H04N 5/2257 |
| 2018/0146347 A1* | 5/2018 | Rudge | ..................... | H04W 4/12 |
| 2018/0276235 A1 | 9/2018 | Rudge et al. | | |
| 2019/0287149 A1* | 9/2019 | Papp | ................. | G06Q 30/0619 |

OTHER PUBLICATIONS

Abandonment dated Jun. 26, 2018 by the USPTO for U.S. Appl. No. 15/581,874, filed Apr. 28, 2017 and published as US 2018/0146347 A1 on May 24, 2018 (Inventor—Scott Rudge) (3 Pages).

Non Final Rejection dated Oct. 18, 2018 by the USPTO for U.S. Appl. No. 15/993,101, filed May 30, 2018 and granted as US 10,353,868 on Jul. 16, 2019 (Inventor—Scott Rudge) (14 Pages).

Response to Non Final Rejection dated Jan. 18, 2019 to the USPTO for U.S. Appl. No. 15/993,101, filed May 30, 2018 and granted as US 10,353,868 on Jul. 16, 2019 (Inventor—Scott Rudge) (7 Pages).

Notice of Allowance dated Mar. 1, 2019 by the USPTO for U.S. Appl. No. 15/993,101, filed May 30, 2018 and granted as US 10,353,868 on Jul. 16, 2019 (Inventor—Scott Rudge) (9 Pages).

Amendment after Notice of Allowance Rule 312 dated May 31, 2019 to the USPTO for U.S. Appl. No. 15/993,101, filed May 30, 2018 and granted as US 10,353,868 on Jul. 16, 2019 (Inventor—Scott Rudge) (9 Pages).

Issue Notification dated Jun. 26, 2019 by the USPTO for U.S. Appl. No. 15/993,101, filed May 30, 2018 and granted as US 10,353,868 on Jul. 16, 2019 (Inventor—Scott Rudge) (1 Page).

U.S. Appl. No. 15/581,874, filed Apr. 28, 2017, Scott Rudge.

U.S. Appl. No. 15/993,101 (10,353,868), filed May 30, 2018 (Jul. 16, 2019), Scott Rudge.

\* cited by examiner

| | A | B | C | D |
|---|---|---|---|---|
| 1 | Date: 5-20-18 | | Date:5-20-18 | |
| 2 | Manual run 8:10_Cond | | Manual run 8:10_Flow | |
| 3 | ml | mS/cm | ml | ml/min |
| 4 | 0.00 | 53.51 | 0.00 | 5.00 |
| 5 | 0.04 | 53.52 | 0.04 | 5.00 |
| 6 | 0.08 | 53.52 | 0.08 | 5.00 |
| 7 | 0.12 | 53.52 | 0.12 | 5.00 |
| 8 | 0.16 | 53.52 | 0.16 | 5.00 |
| 9 | 0.20 | 53.53 | 0.20 | 5.00 |
| 10 | 0.24 | 53.53 | 0.24 | 5.00 |
| 11 | 0.28 | 53.53 | 0.28 | 5.00 |
| 12 | 0.32 | 53.54 | 0.32 | 5.00 |
| 13 | 0.36 | 53.54 | 0.36 | 5.00 |
| 14 | 0.40 | 53.54 | 0.40 | 5.00 |
| 15 | 0.44 | 53.54 | 0.44 | 5.00 |
| 16 | 0.48 | 53.54 | 0.48 | 5.00 |
| 17 | 0.52 | 53.54 | 0.52 | 5.00 |
| 18 | 0.56 | 53.54 | 0.56 | 5.00 |
| 19 | 0.60 | 53.54 | 0.60 | 5.00 |
| 20 | 0.64 | 53.54 | 0.64 | 5.00 |
| 21 | 0.68 | 53.54 | 0.68 | 5.00 |
| 22 | 0.72 | 53.54 | 0.72 | 5.00 |
| 23 | 0.76 | 53.54 | 0.76 | 5.00 |
| 24 | 0.80 | 53.54 | 0.80 | 5.00 |
| 25 | 0.84 | 53.54 | 0.84 | 5.00 |

METHODS AND SYSTEMS FOR EVENT BASED NOTIFICATIONS

CROSS REFERENCE TO RELATED PATENT APPLICATION

This application is a continuation of U.S. patent application Ser. No. 15/993,101, filed on May 30, 2018, which is a continuation-in-part of U.S. patent application Ser. No. 15/581,874, filed on Apr. 28, 2017, which claims priority to U.S. Provisional Application No. 62/320,782, filed Apr. 11, 2016, herein incorporated by reference in their entireties.

BACKGROUND

Laboratory equipment is not capable of providing push notifications that reflect a status of the equipment (e.g., on, off, operating, standby, etc. . . . ), a status of one or more parameters of the equipment (e.g., a fluid level, a column status, etc. . . . ), an operational result (e.g., separation complete), and the like. Instead, frequent manual checks of the equipment's status, either on-site, or via a remote login are necessary to determine such information about the equipment. These and other shortcomings are addressed by the methods and systems described herein.

SUMMARY

It is to be understood that both the following general description and the following detailed description are exemplary and explanatory only and are not restrictive. Methods and systems are disclosed receiving equipment data from a piece of equipment, wherein the equipment data comprises a data file comprising one or more data entries, storing the data file in a file storage location, monitoring, based on a profile, the file storage location for data file activity, wherein the profile defines one or more file storage locations to monitor, one or more types of data files to monitor, one or more types of data entries within a data file to monitor, and a message type, processing, based on data file activity in the monitored file storage location, the data file according to the profile, generating, based on the processed data file, a message according to the profile, and transmitting, the message.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 5 is an example data file;

DETAILED DESCRIPTION

Figure 1:
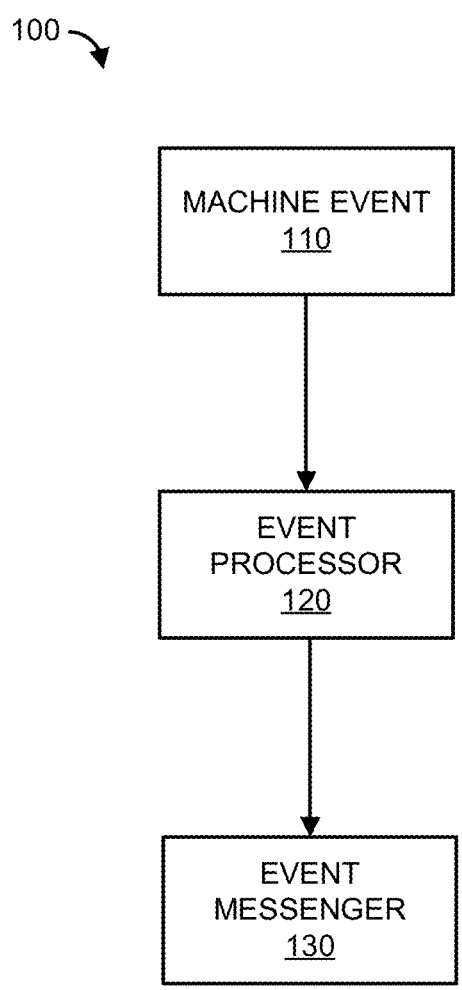
FIG. 1 is an example event based message system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, magnetic storage devices, or any storage medium developed in the future (for example, quantum devices and nucleic acids).

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to improvements in computer functionality related to equipment operation (e.g., factory and/or laboratory equipment), manufacturing, and product assembly. There is copious information generated by most equipment/computer combinations, not all of it is readable by humans, and of the subset readable by humans, a further subset is relevant. In order to be useful, a processor of the information must be able to sort the information on a variety of factors, for example:

Is the information recent?

Does the information relate to a change in status of the equipment/computer?

Is the information routine or exceptional?

Is the information redundant?

In order to extract the useful information, the processor can utilize a parsing function, or other function, that can sort this data. The parsing function can work on key words or phrases, or a set of specified events can be created. These specified events can be identified by machine code numbers or other identifiers. Useful information can be defined or configured by the user, or it may be fixed by the coding. Useful information, once identified by the parsing function, can be packaged for a communication (e.g., a message).

Communication may be by SMS, by internet through email or a third party platform, such as Twitter, or by pager or phone call with pre-recorded messages. The processor takes the information identified by the parsing function and translates it, if necessary, into a message understandable by the user. The message can then be sent to the end user. When sending the message, the messaging function may be configured to communicate directly with the end user, or may use a third party platform.

Some advantages include, without limitation, live notifications containing information about an operation of equipment (e.g., a run). Individuals and/or companies who outsource projects involving for example, ÄKTA and UNICORN systems, will quickly know valuable information about the system(s). This reduces a great deal of worry and increases communication transparency. Valuable time is saved between the two parties due to a reduction in phone calls and/or emails. For individuals and/or companies who utilize the disclosed methods and systems internally, the disclosed methods and systems allows the user(s) to focus on other tasks knowing the UNICORN and ÄKTA system is being monitored automatically. This, in turn, increases productivity and decreases stress.

The methods and systems disclosed can take the form of a software embodiment that is able to detect a signal being passed from equipment to a computer, capture that signal and turn it into a message that is transmitted to an end user. The message can be, for example, a SMS or text message. The message can be, for example, an email. The message is transmitted via the internet. There can be, for example, one or multiple users.

The methods and systems disclosed can take the form of a software embodiment that is comprised of an event processor function, a trailer function, a parser function and a messaging function, that detects a signal being passed from equipment to a computer, captures the signal and turns it into a message that is transmitted to one or more end users. The messaging function can be provided by a third party. The event can be generated as a bit or series of bits of known addresses. The event can be generated by periodically reading an event log file. The codes recognized by the trailer function can be pre-programmed in the software. The codes recognized by the trailer function can be user configurable. The message can be comprised of an SMS, an email or via the interne. The disclosed software can be part of the operating software for the equipment. The disclosed software can be an add-on and run separately from the operating software for the equipment. The operating system for the computer can be Windows based, iOS® based, and/or Linux based. Further, the software and/or operating system can further utilize Basic, Visual Basic, Pascal, Fortran, Java, C, C++, Python, Javascript, Structured Query Language (SQL), and Ruby. The software can reside on a Windows based computer that interacts with UNICORN software written for an ÄKTA preparative chromatography system, and generates messages for one or more end users. The event can be generated by monitoring an event log file. The message can be an SMS. The SMS can be generated by third party software. The codes for the events can be pre-programmed. The codes for the events can be user configurable. Software is disclosed that monitors a fermenter or bioreactor, detects events, parses them and exports them as a message to an end user or users. Software is disclosed that monitors an HPLC or variant thereof, detects events, parses them and exports them as a message to an end user or users.

FIG. 1 is block diagram illustrating various aspects of an exemplary system 100 in which the present methods and systems can operate. A machine event 110 can be generated by one or more pieces of equipment. A machine event 110 can be represented as data. One or more data structures can be used to represent the machine event 110. As described herein, any suitable equipment that is otherwise incapable of pushing a notification can be used, such as certain laboratory and/or manufacturing equipment. For example, a chromatography skid, a fermenter, or a bioreactor. Examples of machine events 110 include, but are not limited to, a change in a status of the equipment (e.g., on, off, operating, standby, etc. . . . ), a change in a status of one or more parameters of the equipment (e.g., a fluid level, a column status, a pump status, pressures, temperature, solution conductivity and pH, sample collection, etc. . . . ), a generation of an operational result (e.g., separation complete, column regenerated, system cleaned, system ready for storage, etc. . . . ), an alarm state (e.g., high or low system pressure, high or low conductivity, high or low temperature, high or low pH, high or low flow rate, air in the system, malfunction of sample collection, etc. . . . ), an issued alert that was pre-transcribed into a protocol, and the like. As the one or more pieces of equipment operate, data is generated indicative of the machine event 110. Backup files are generated at the start of an equipment's operation and are updated to log machine events throughout the operating period. Resource files, ASCII files, comma delimited values files, and any other file types associated with the equipment (e.g., M01 files) are generated at the start of an operation, throughout the operation, at the end of the operation, and/or at equipment powering on or off; and are updated based on machine events.

An event processor 120 can be configured to request (e.g., poll), receive, or otherwise monitor for the machine event 110. The event processor 120 can identify a presence of data indicative of the machine event 110 and analyze the data indicative of the machine event 110 to determine the nature and extent of the machine event 110. The event processor 120 can provide an indication of the machine event 120 to an event messenger 130, based on the nature and extent of the machine event 110. The event messenger 130 can be configured to transmit a notification of the machine event 130. The event messenger 130 can be configured to, for example, generate a message. Example messages include, but are not limited to, an output to a user interface on a computing device coupled to the one or more pieces of equipment, an electronic mail (e-mail), a Short Message Service (SMS), a social media message (e.g., a "tweet" via TWITTER®), a data message (e.g., an iMessage), a page of a pager, a phone call with pre-recorded messages, and the like. In an aspect, at least one of the data indicative of the machine event 110, the event processor 120 and/or the event messenger can reside within a computing device or within one or more computing devices in communication over a network.

Figure 2:
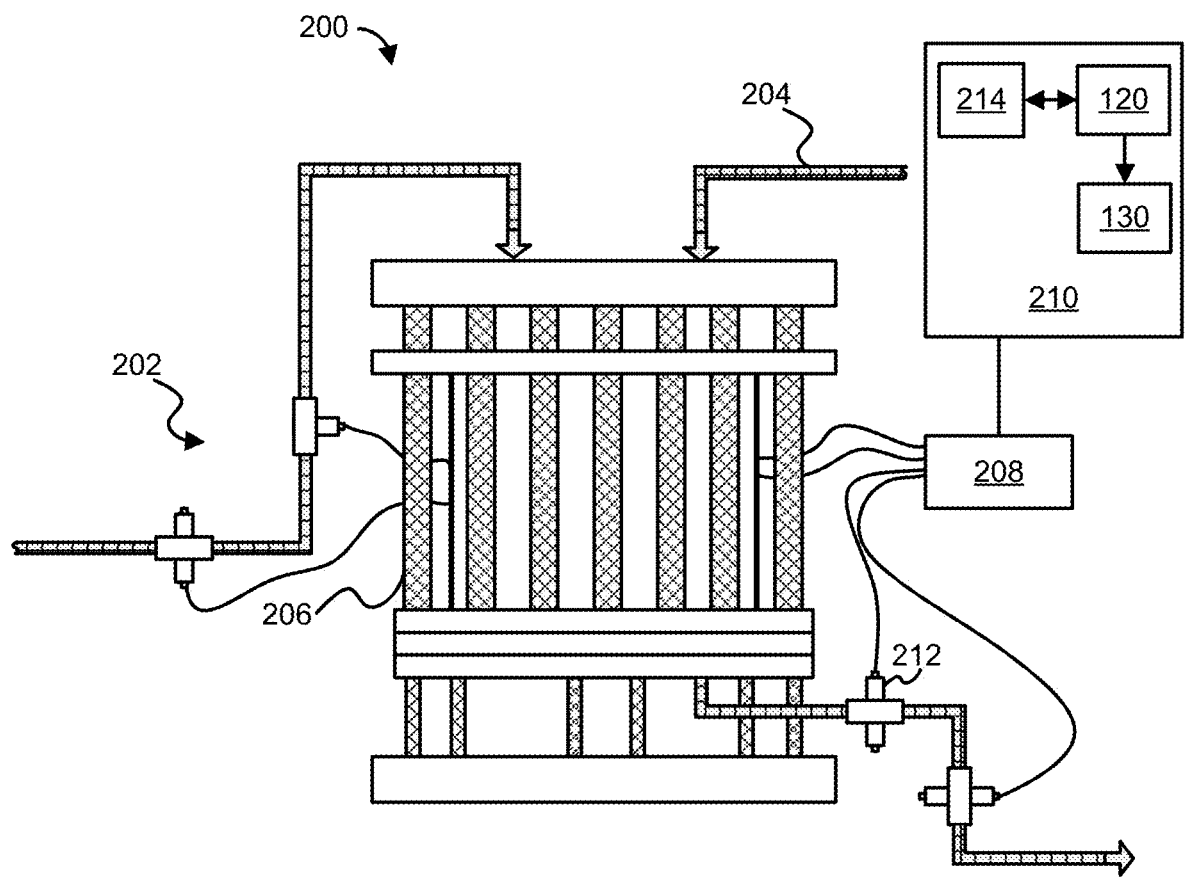
FIG. 2 is an example event based message system coupled to equipment.

FIG. 2 is a block diagram illustrating various aspects of an exemplary system 200 in which the present methods and systems can operate. One skilled in the art will appreciate that provided herein is a functional description and that the respective functions can be performed by software, hardware, or a combination of software and hardware. The system 200 can comprise a chromatography system or skid, a High-Performance Liquid Chromatography (HPLC), a fermenter, and/or a bioreactor. While described herein in the context of a chromatography system or skid, it is specifically contemplated that different types of equipment can be used with the present methods and systems. The system 200 can be used, for example, to separate biomolecules in a complex mixture, isolate a single biomolecule, and/or eliminate contaminants. The system 200 can comprise a mobile phase liquid supply system 202, a material injection system 204, a chromatography or separation column 206, a process controller 208, and a computing device 120. The mobile phase liquid supply system 202 can comprise one or more reservoirs that hold and supply the mobile phase liquid(s) used to drive raw materials injected by the material injection system 204 through column 206. Pumps belonging to the mobile phase liquid supply system 202 can impart a high pressure to the mobile phase liquid. In an aspect, the pumps can be used to program the mobile phase liquid(s), for example, by mixing two or more solvents in a particular ratio. The material injection system 204 can be used to inject, for example, raw materials requiring separation and/or purification into the mobile phase liquid(s). The chromatography separation column 206 can be used to separate and/or purify the injected raw materials.

In an aspect, the process controller 208 and/or the computing device 210 can be used to control the system 200. The process controller 208 and/or the computing device 210, for example, can react to operator inputs and control operation of the various components of the system 200 such as, for example, pumps and valves. In an aspect, the process controller 208 and/or the computing device 210 can be used to monitor an exit volume or output of the column 206 and to make determinations regarding the packing quality or efficiency of the column 206. If the packing quality or efficiency of a monitored column is determined to be unacceptable, chromatography process can be stopped until the questionable column is repacked or replaced.

The process controller 208 and/or the computing device 210 can be configured to receive signals from any other sensor and/or system that can detect a machine event and/or provide data regarding the system 200 (such data can be referred to herein as process data, equipment data, and the like). For example, the process controller 208 and/or the computing device 210 can be coupled to one or more sensors configured to detect a change in a status of the equipment (e.g., on, off, operating, standby, etc. . . . ). The process controller 208 and/or the computing device 210 can be coupled to one or more sensors configured to detect a change in a status of one or more parameters of the equipment (e.g., a fluid level, a column status, etc. . . . ). The process controller 208 and/or the computing device 210 can be coupled to one or more sensors configured to detect a generation of an operational result (e.g., separation complete). Any of the one or more sensors can be configured to generate one or more signals and/or data indicative of the machine event.

For example, a detector 212 can be used to monitor the exit volume or output of the chromatography column 206 and can provide process monitoring data to the process controller 208. The detector 212 can be any type of detector that is capable of monitoring process properties useful for determining the efficiency and/or packing quality of the column 206. In an aspect, the detector 212 can be an electrical conductivity detector. In another aspect, the detector 212 can be an ultraviolet (UV) detector, a fluorescence detector, a refractive detector, a pH detector, etc. The detector 212 can thus be configured to detect one or more machine events 110.

Figure 3:
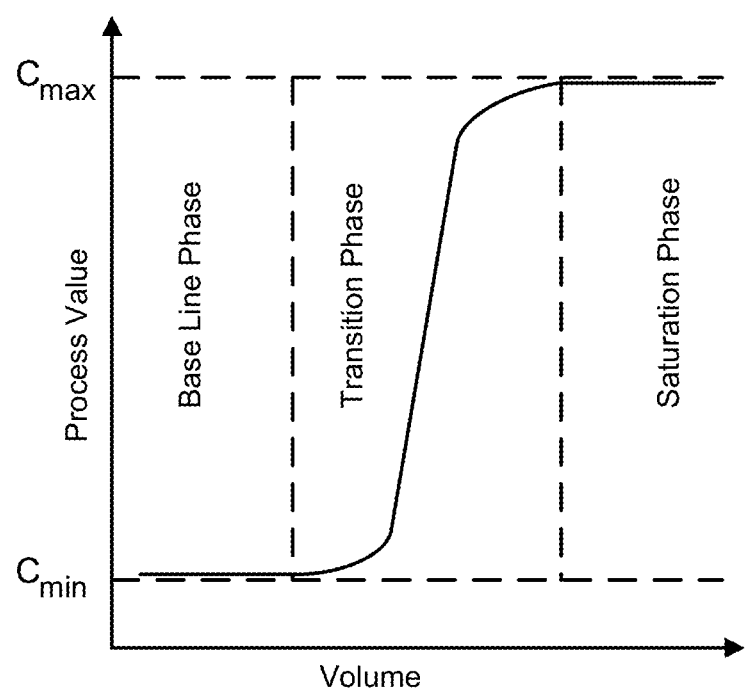
FIG. 3 illustrates an example normalized plot of a chromatography step-up transition.

Process data 214 (e.g., data indicative of a machine event 110) output by the detector 212 can be operated upon by the process controller 208 and/or the computing device 210 to produce column dispersion parameters or performance parameters (e.g., data indicative of a machine event 110). In an aspect, the process data 214 operated upon to produce the performance parameters can comprise data corresponding to a chromatography step transition (a machine event 110) between a first mobile phase liquid and a second mobile phase liquid. As used herein, a chromatography step transition is a relatively abrupt change in the mobile phase liquid provided to the column 206 that is reflected by a change in a measurable physical characteristic such as, for example, conductivity, pH, etc. A step transition is typically in the form of a breakthrough curve or a washout curve that is due to the replacement of one mobile phase liquid (e.g., solution) by another mobile phase liquid (solution) in a continuously flowing manner. As shown in FIG. 3, a step transition can be thought of as having three phases (e.g., a baseline phase, a transition phase, and a saturation or plateau phase), and is different than a pulse or a gradient. FIG. 3 illustrates an example normalized plot of a chromatography step-up transition.

In operation, the detector 212 can receive one or more signals corresponding to a chromatography step transition and provide the one or more signals to the process controller 208. The process data 214 output by the detector 212 can comprise raw chromatography data. The process data 214 can be stored on a memory element of the computing device 210. The process data 214 can comprise one or more signals corresponding to a chromatography step transition between a first mobile phase liquid and a second mobile phase liquid.

Figure 4:
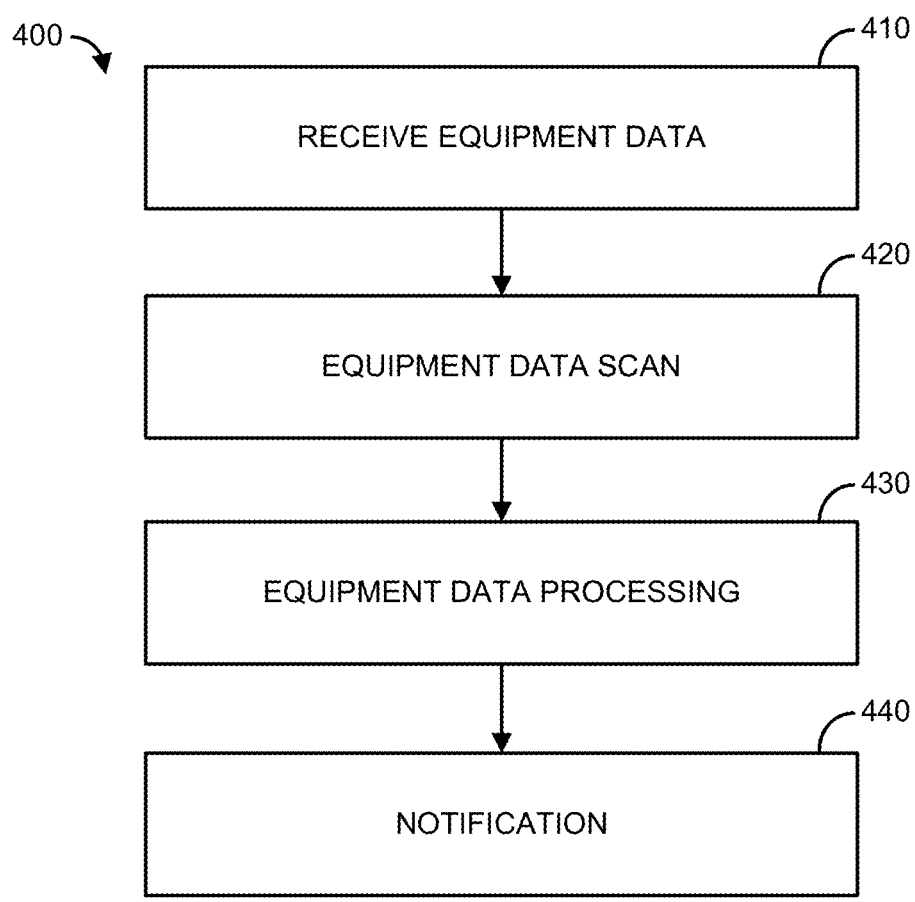
FIG. 4 is an example process.

FIG. 4 illustrates an example process 400 for equipment process monitoring and/or assessment. At block 410, equipment data can be received and/or stored as a data file. Example data files include, but are not limited to, a spreadsheet, a text file, a database, a log file, resource files, backup files, or any other file types specific to the equipment's operating system or operating systems (e.g., M01 file type), combinations thereof, and the like. At block 420, a scan for the data file(s) can be performed. For example, a sentinel software program (e.g., Cron, or other automated agent) can monitor one or more possible data file storage locations for one or more data files that fit one or more profiles. In another aspect, the equipment data can be retrieved directly from the system 200. A profile can comprise unique values, parameters, and/or metadata that allows for the consistent automatic processing of the data file. A profile can define one or more of, data file storage location(s) to monitor, data file type(s) to monitor, a data entry type within a data file to monitor, such as alarms, alarm acknowledgement, messages, run start, run end, run pause, unresponsive equipment, combinations thereof, and/or the like. Further, the profile can define codes within the profile. For example, the data entry in the profile can contain a specific code (e.g., code 0002551) that indicates an event, such as alarms, alarm acknowledgement, messages, run start, run end, run pause, unresponsive equipment, combinations thereof, and/or the like. Thus, the profile can contain data entries, codes, or a combination of the two.

The profile can be created by a user. The profile can be associated with a specific piece of equipment or can be associated with a plurality of pieces of equipment. In an aspect, the profile can be configured to direct the sentinel software program to periodically scan a designated local and/or network location for the data file(s). The profile can direct data acquisition when a data file name matches a file name identifier in the profile. For example, if the data file name contains "LOGBOOK" and/or "LOGBOOK" is contained within the profile, or if the data file name contains a term associated with logging data and data logging is contained within the profile, the sentinel software program will recognize that the data file should be scanned for data acquisition.

FIG. 5 illustrates an example data file 500. The data file 500 can be stored as a spreadsheet (e.g., Microsoft Excel), resource file (e.g., PDF), backup file, or any other file type specific to the equipment's operating system operating systems in the case of multiple pieces of equipment (e.g., M01 file type). As shown, the data file 500 contains a plurality of data entries from a performed process. Specifically, the data file 500 indicates the date the process was run (e.g., May 20, 2018), and the types of processes run (e.g., a conditional process, a flow process). The data file 500 includes the amount of milliliters measured as well as the flow rate of the process. While the data file 500 is shown with only several data entries and data types, a person skilled in the art would appreciate the data file 500 can contain any number of data entries and any data type.

Once the data file 500 has been identified based on the profile, the data file can be processed at block 430. In an aspect, if the equipment is a chromatography skid, the methods and systems can perform a transition analysis to generate a result representing a packed-bed column integrity and packing quality on the chromatography process skid (the system 200). Transition analysis provides a mathematical analysis of column integrity, particularly statistical moment based calculation of height equivalent to a theoretical plate (HETP). An example approach involving transition analysis can comprise transforming a breakthrough or washout curve into a peak by taking the first derivative. Dispersion parameters can then be derived from the peak position and shape. Transition analysis is the inference of dispersion parameters from a step transition. A step transition is an abrupt change in the mobile phase, preferably reflected by a change in a measurable physical characteristic in the fluid, e.g. conductivity, pH, protein concentration, etc. In preparative chromatography, a step transition is either in the form of a breakthrough curve or a washout curve. Once the data file 500 has been analyzed via transition analysis, results of the transition analysis can be stored in a memory element of the computing device 210 or another computing device along with the data file 500.

Returning to FIG. 4, the process 400 can proceed to block 440 and generate a notification. The notification can be generated based on the profile. For example, the profile can specify that the notification should be in the format of a user interface on a computing device coupled to the one or more pieces of equipment, an electronic mail (e-mail), a Short Message Service (SMS), a social media message (e.g., a "tweet" via TWITTER®), a data message (e.g., an iMessage®), a page of a pager, a phone call with pre-recorded messages, and the like. In an aspect, a report on the data and/or the processing can be generated and included with the notification. In an aspect, one or more reports can be generated. For example, the methods and systems disclosed can generate reports in tabular format of any results analyzed using the profile. Reports can be generated based on a desired number of previous lots, for a specific timeframe, and/or for specific lots. The notification can be transmitted via an output to one or more of, a user interface on a computing device coupled to the one or more pieces of equipment, an electronic mail (e-mail), a Short Message Service (SMS), a social media message (e.g., a "tweet" via TWITTER®), a data message (e.g., an iMessage®), a page of a pager, a phone call with pre-recorded messages, and the like.

Figure 6:
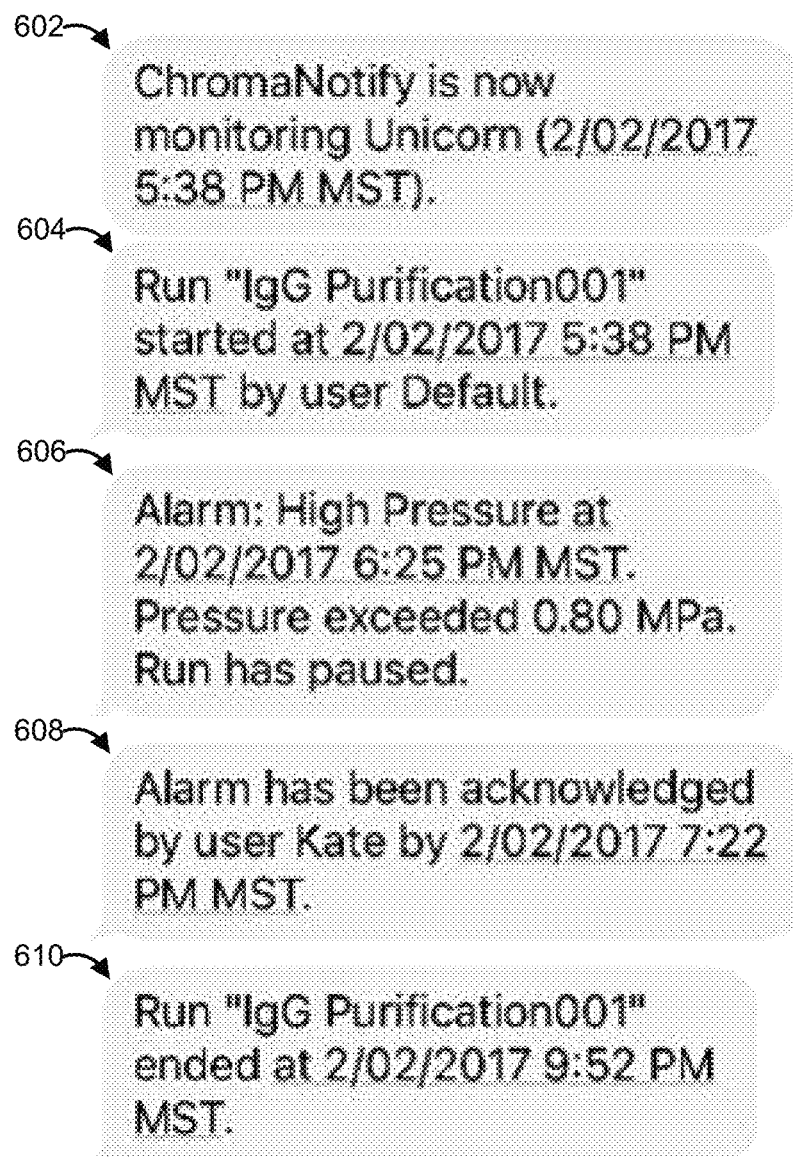
FIG. 6 is an example communication.

FIG. 6 illustrates an example communication 600. The example communication 600 comprises messages 602, 604, 606, 608, and 610. As shown, the message 602 indicates that Chromallotify is now monitoring Unicorn (e.g., a piece of equipment) at 5:30 PM MST on Feb. 2, 2017. The message 604 indicates that IgG Purification001 has started to run at 5:38 PM MST on Feb. 2, 2017. Further, the message 604 indicates that the IgG Purification001 was started by a user named "Default." The message 606 indicates that there is an alarm. Specifically, the message 606 indicates there was a "High Pressure" alarm at 6:25 PM MST on Feb. 2, 2017. The message 606 also indicates that the pressure exceeded a pressure threshold (e.g., 0.80 MPa.). Further, the message 606 indicates that the running of Purification001 has paused. The message 608 indicates that the alarm has been acknowledged by a user (e.g., Kate). The alarm was acknowledged at 7:22 PM MST on Feb. 2, 2017 as shown in message 608. In an aspect, when the alarm is acknowledge, the process (e.g., IgG Purification001) is restarted, either manually or automatically, after being paused. The message 610 indicates that process "IgG Purification001" has ended at 9:52 PM on Feb. 2, 2017.

Figure 7:
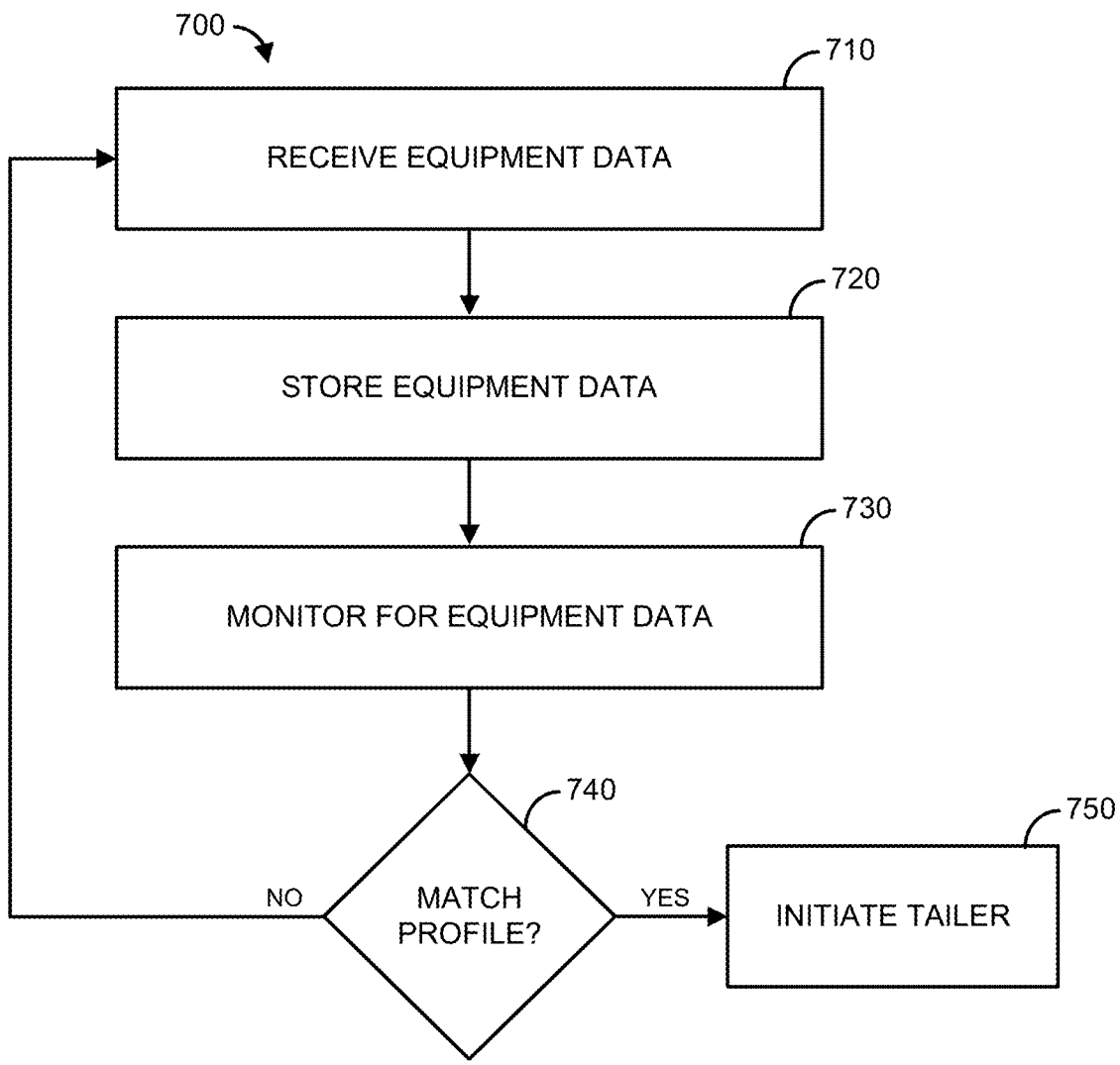
FIG. 7 is an example process.

FIG. 7 illustrates an example Event Process 700 for event processing. The Event Process 700 can monitor the equipment for an event and/or an event signal. For example, the event signal may take the form of the changing of an error bit from 0 to 1. For example, the event signal may take the form of a string of characters being broadcast over a specific analog address. An event may also be shown by the change in a data file, such as an event log that is kept by a computing device coupled to the equipment. The Event Process 700 can recognize these signals and identify an event. At block 710, equipment data can be received from the equipment. At block 720, the equipment data can be stored on memory in the equipment and/or on memory in the computing device. The equipment data can comprise one or more data files from one or more pieces of equipment. The one or more data files can adhere to a file naming convention. The one or more data files can be pre-set to be stored in one or more specific folders/directories. At block 730, the Event Process 700 can access a profile that specifies at least one of a folder to monitor and/or a file type to monitor. At block 740 it can be determined whether activity has occurred in the monitored folder, for example, an addition of a data file and/or a modification of a data file. If at block 740, the data file does not match the specified file type, the Event Process 700 returns to block 710. If at block 740, the data file does match the specified file type the Event Process 700 can flag the data file as a possible event and the Event Process 700 proceeds to block 750 to initiate a Tailer process.

Figure 8:
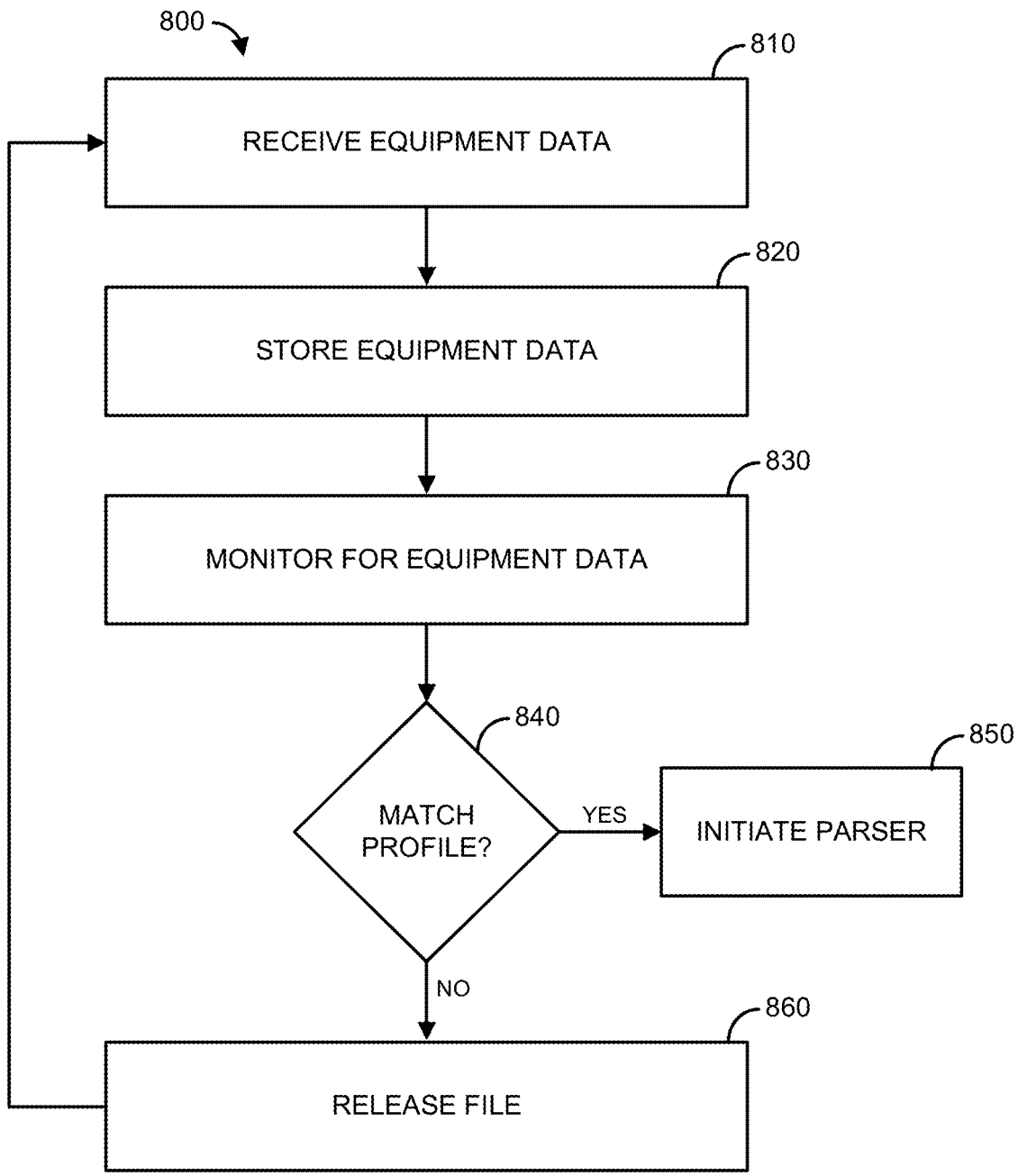
FIG. 8 is an example process.

FIG. 8 illustrates an example Tailer Process 800. The Tailer Process 800 can determine if an event identified by the Event Process 700 is real. For example, the Tailer Process 800 can compare an event(s) to a list of codes to determine if there is a match. Table T1, shown below, provides non-limiting examples of the types of events that may be associated with a specific code.

TABLE T1

| CODE | EVENT |
| --- | --- |
| PressureHigh Alarm | High Pressure |
| PressureLow Alarm | Low Pressure |
| Cond High Alarm | High Conductivity |
| Cond Low Alarm | Low Conductivity |
| pH High Alarm | High pH |

TABLE T1-continued

| CODE | EVENT |
| --- | --- |
| pH Low Alarm | Low pH |
| SamplePressure High Alarm | High Pump P-960 Pressure |
| SamplePressurue Low Alarm | Low Pump P-960 Pressure |
| UV1 High Alarm | High Ultra Violet Light |
| UV1 Low Alarm | Low Ultra Violet Light |

The codes may be fixed in the software and/or can be user configured. Further, similar to the Event Process 700, the Tailer Process 800 can also be configured to monitor a specified file and/or specified multiple files in a specific location or directory, and determine any changes made to any of the files located therein, rather than rely on the Event Process 700 to provide a possible event to the Tailer Process 800. At block 810, equipment data can be received from the equipment. At block 820, the equipment data can be stored on memory in the equipment and/or on memory in the computing device. The equipment data can comprise one or more data files from one or more pieces of equipment. The one or more data files can adhere to a file naming convention. The one or more data files can be pre-set to be stored in one or more specific folders/directories. At block 830, the Tailer Process 800 can access a profile that specifies at least one of a folder to monitor, a file type to monitor, and/or a data entry type or code within a data file to monitor, such as alarms, alarm acknowledgement, messages, run start, run end, run pause, unresponsive equipment, combinations thereof, and/or the like. The profile can be created by a user. The monitored data file can be accessed, opened, and one or more data entries can be scanned. At block 840 it can be determined whether one or more data entries scanned matches the profile. If at block 840, the data entry does not match the profile, the Tailer Process 800 returns to block 810. If at block 840, the data entry does match the profile, the Tailer Process 800 can flag the data entry as a confirmed event and the Tailer Process 800 proceeds to block 850 to initiate a Parser process.

Figure 9:
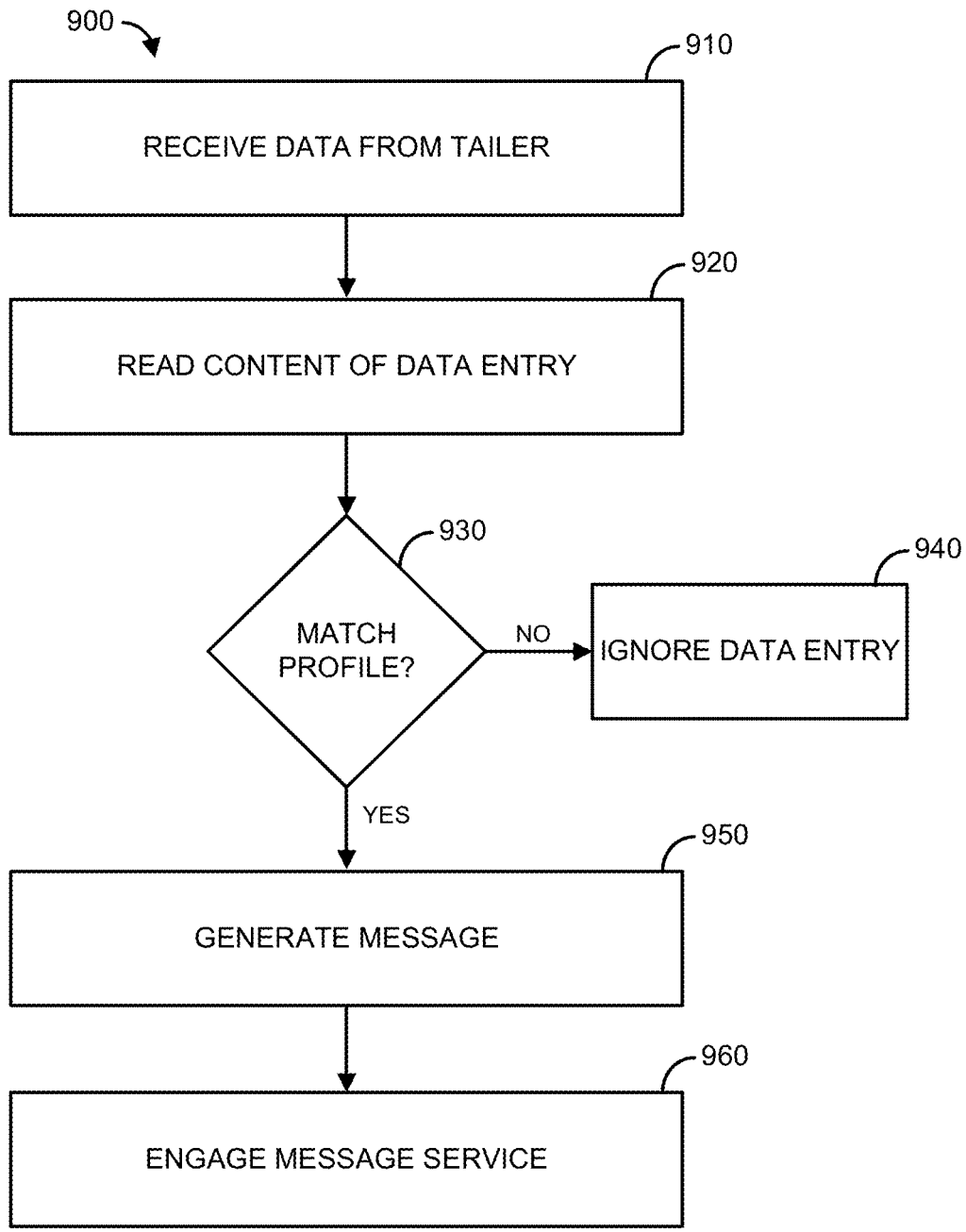
FIG. 9 is an example process.

FIG. 9 illustrates an example Parser Process 900. At block 910, the data entry can be received from the Tailer Process 800. At block 920, the content of the data entry can be parsed based on the type of data file that contains the data entry. For example, the data file may be a comma delimited data file. The Parser Process 900 can then parse out information separated by commas. In another example, the data file may be a log file generated according to an industry standard and/or a manufacturer specification. The Parser Process 900 can then parse out information based on the industry standard and/or the manufacturer specification by, for example, keyword, code, and the like. Other types of data files and parsing techniques are specifically contemplated. At block 930 it can be determined whether the information parsed matches a profile. The profile can comprise, for example, a list of events, codes, keywords, such as alarms, alarm acknowledgement, messages, run start, run end, run pause, unresponsive equipment, combinations thereof, and/or the like. If at block 930, the information parsed does not match the profile, the Parser Process 900 ignores the data entry at block 940. If at block 930, the information parsed does match the profile, the Parser Process 900 can proceed to block 950 and generate a message based on the event. Message generation can vary based on a type of event and/or a type of message. The type of message can be specified in the profile. For example, if an SMS message is specified, the message will be formatted to comprise one or more alphanumeric strings consisting of no more than 160 characters.

Other standards can be supported that dictate other limitations on string size. The Parser Process 900 will further determine recipient contact information, such as one or more phone numbers, that are to receive the SMS message. The one or more phone numbers can be maintained in a list or database that can be updated by a user. The Parser Process 900 can then proceed to block 960 and engage a message service. The Parser Process 900 can provide the generated message, along with any necessary information to effect transmission (e.g., recipient contact information, sender contact information, etc. . . . ), to the message service in order for the message service to transmit the message. For example, the Parser Process 900 can provide an account identifier to the message service such as a phone number that the Parser Process 900 desires to send the message to. The account identifier can also be an application key associated with the message service. For example, the application key can be an encrypted key that includes a Token Identifier and an Authentication Token that the message service can use to transmit the message. The Token Identifier can identify the destination of the message, and the Authentication Token can be used by the message service to verify that the message to be sent to the destination is valid. The Token Identifier can also indicate where the message is coming from (e.g., the Parser Process 900) in order to inform the recipient of the message where the message is coming from.

Figure 10:
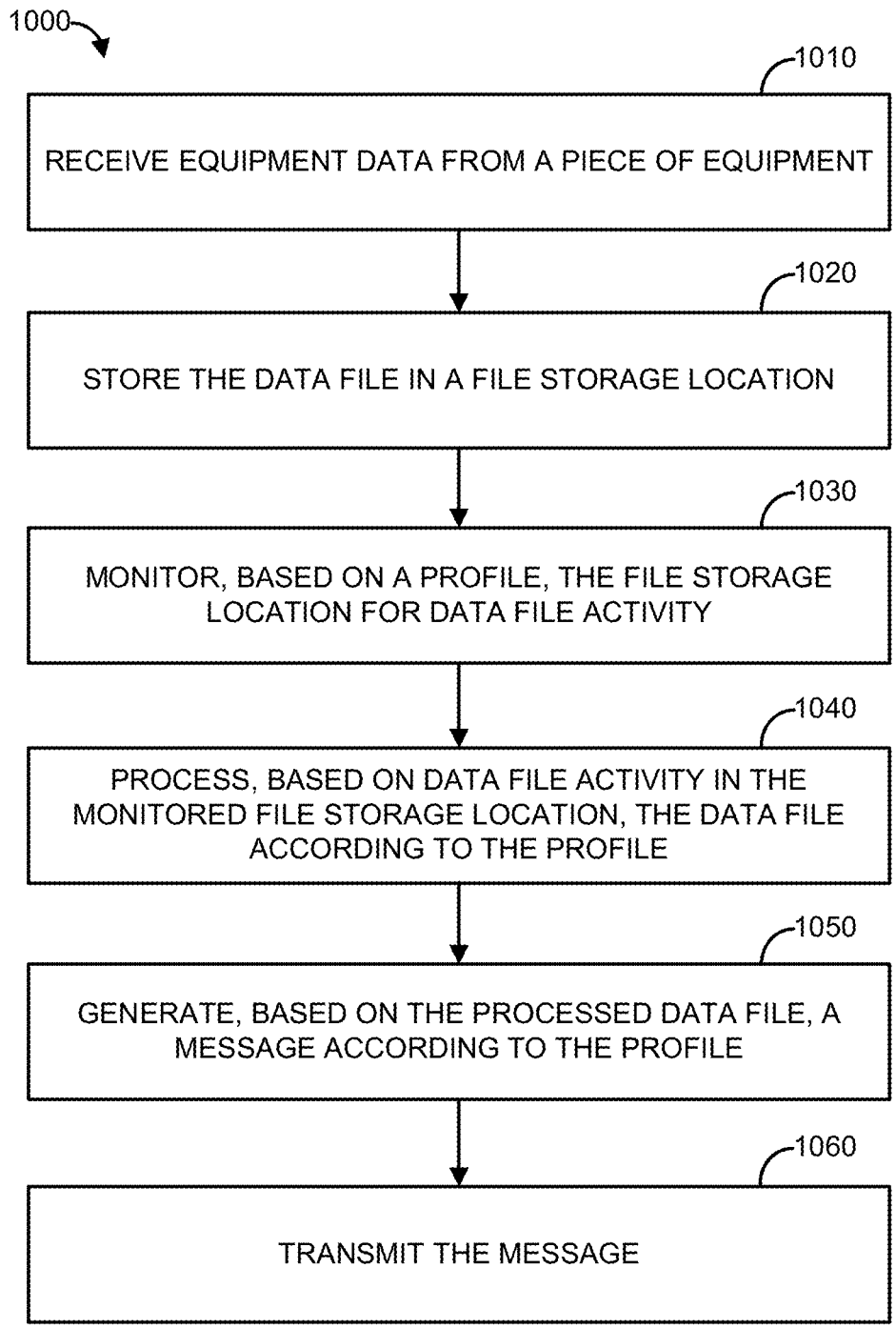
FIG. 10 is an example process.

In an aspect, illustrated in FIG. 10, provided is a method 1000 for event based notifications. The method 1000 can comprise receiving equipment data from a piece of equipment, wherein the equipment data comprises a data file comprising one or more data entries at block 1010. Receiving equipment data from a piece of equipment can comprise monitoring a network file storage location for a data file or directly retrieving the equipment data from the piece of equipment.

The method 1000 can comprise storing the data file in a file storage location at block 1020. Storing the data file in a file storage location can comprise determining, based on the equipment data, a type of the piece of equipment, determining a file storage location associated with the type of the piece of equipment, and storing the data file in the file storage location associated with the type of the piece of equipment.

The method 1000 can comprise monitoring, based on a profile, the file storage location for data file activity, wherein the profile defines one or more file storage locations to monitor, one or more types of data files to monitor, one or more types of data entries within a data file to monitor, and a message type at block 1030. Monitoring, based on the profile, the file storage location for data file activity, can comprise determining one or more of, storage of a new data file or modification of an existing data file. The one or more types of data files to monitor can comprise one or more of resource files, ASCII files, comma delimited values files, and any other file types associated with the equipment (e.g., M01 files). The one or more types of data entries within a data file to monitor can comprise one or more of alarm types, alarm acknowledgement, equipment pause, run end, and manual message within the method and other string data entries. The message type can comprise one or more of a user interface on a computing device coupled to the one or more pieces of equipment, an electronic mail (e-mail), a Short Message Service (SMS), a social media message, a data message (e.g., an iMessage®), a page of a pager, a phone call with pre-recorded messages, and the like.

The method 1000 can comprise processing, based on data file activity in the monitored file storage location, the data file according to the profile at block 1040. Processing, based on data file activity in the monitored file storage location, the data file according to the profile can comprise determining that the data file comprises a type that matches the profile and determining that the data file comprises a data entry that matches the profile. A result of the processing can be the identification of an event if the data file type and the data entry match the profile. Processing, based on data file activity in the monitored file storage location, the data file according to the profile can comprise determining that the data file comprises chromatography data, performing a transition analysis on the chromatography data to generate transition data representing a column integrity of a chromatography process skid.

The method 1000 can comprise generating, based on the processed data file, a message according to the profile at block 1050. Generating, based on the processed data file, a message according to the profile can comprise determining, based on the message type, message content and determining, based on the message type, a message recipient. For example, the message type can be one or more of a user interface on a computing device coupled to the one or more pieces of equipment, an electronic mail (e-mail), a Short Message Service (SMS), a social media message, or a data message (e.g., an iMessage®), a page of a pager, a phone call with pre-recorded messages, and the like. Accordingly, a list and/or a database of recipient contact information can be accessed to determine an identifier of a user device to which to send the user interface, an e-mail address to which to send the e-mail, a phone number to which to send the SMS, a social media handle to which to send the social media message, or an identifier to which to send the data message.

The method 1000 can comprise transmitting, the message at block 1060. Transmitting, the message can comprise determining, based on the message type, a message service and providing the message to the message service for transmission. For example, the message service can comprise an e-mail server, a social media service, an SMS service, and the like.

The method 1000 can further comprise terminating, based on the processing the data file, a process on the piece of equipment.

Example 1

A computer controls a piece of laboratory equipment through digital and analog input/output modules. One digital input address is identified as an error bit. A software program is designed to monitor the address of this bit, and to identify when the bit is switched to 1, indicating an error. The software requires the bit to be set to 1 for 20 consecutive scans before an error message is generated and sent to an end user.

Example 2

In example 1, there are multiple end users, who have been identified with separate addresses at the initiation of the software.

Example 3

In example 2, the addresses of the users are phone numbers, and the message is an SMS or text message.

Example 4

In examples 1, 2 and 3, the addresses are email addresses, and the message is an email.

Example 5

A Windows based computer running UNICORN software (GE Health Care Life Sciences, Marlborough, Mass.) controlling an ÄKTA preparative chromatography unit (GE Health Care Life Sciences, Marlborough, Mass.) records events in an events log. A software program is designed to open this event log 5 times per second and identify changes to the file. When changes are identified, the software compares the changes to a list of event codes that have been selected by the user. If an even matches, a message corresponding to that event is generated and transmitted to a third party provider, along with a list of phone numbers. The third party provider converts the message into a text. The third party provider then transmits the message as a text message to the list of phone numbers.

Example 6

In example 5, the third party provider is Twilio.

Example 7

In example 5, the message is posted as a "tweet" on the third party provider Twitter. End users are notified because they have subscribed to the equipment's Twitter handle.

Example 8

In example 5, the message is converted to an email, and the email is sent to a list of email addresses by email software residing on the computer.

Example 9

In example 5, the equipment is fermenters or bioreactors and associated computer.

Example 10

In example 5, the equipment is an HPLC, a UPLC, a UHPLC or similar analytical chemistry equipment, and associated computer.

Figure 11:
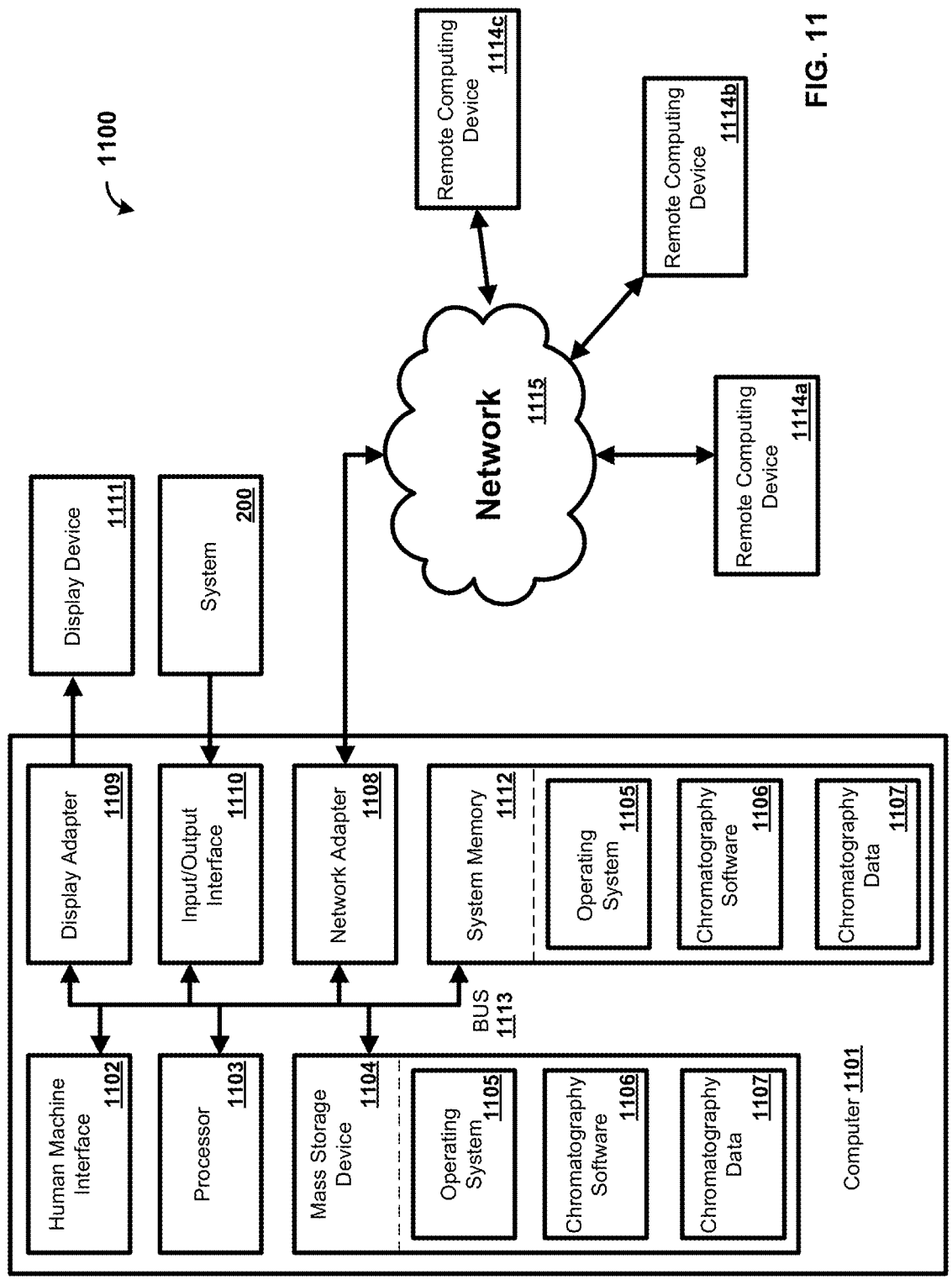
FIG. 11 is an exemplary operating environment.

In an exemplary aspect, the methods and systems can be implemented on a computer 1101 as illustrated in FIG. 11 and described below. By way of example, the process controller 208 and/or the computing device 210 (or a component thereof) of FIG. 2 can be a computer 801 as illustrated in FIG. 11. Similarly, the methods and systems disclosed can utilize one or more computers to perform one or more functions in one or more locations. FIG. 11 is a block diagram illustrating an exemplary operating environment 1100 for performing the disclosed methods. This exemplary operating environment 1100 is only an example of an operating environment and is not intended to suggest any limitation as to the scope of use or functionality of operating environment architecture. Neither should the operating environment 1100 be interpreted as having any dependency or requirement relating to any one or combination of components illustrated in the exemplary operating environment 1100.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage media including memory storage devices.

Further, one skilled in the art will appreciate that the systems and methods disclosed herein can be implemented via a general-purpose computing device in the form of a computer 1101. The computer 1101 can comprise one or more components, such as one or more processors 1103, a system memory 1112, and a bus 1113 that couples various components of the computer 1101 including the one or more processors 1103 to the system memory 1112. In the case of multiple processors 1103, the system can utilize parallel computing.

The bus 1113 can comprise one or more of several possible types of bus structures, such as a memory bus, memory controller, a peripheral bus, an accelerated graphics port, and a processor or local bus using any of a variety of bus architectures. The bus 1113, and all buses specified in this description can also be implemented over a wired or wireless network connection.

The computer 1101 typically comprises a variety of computer readable media. Exemplary readable media can be any available media that is accessible by the computer 1101 and comprises, for example and not meant to be limiting, both volatile and non-volatile media, removable and non-removable media. The system memory 1112 can comprise computer readable media in the form of volatile memory, such as random access memory (RAM), and/or non-volatile memory, such as read only memory (ROM). The system memory 1112 typically can comprise data such as equipment data 1107 and/or program modules such as operating system 1105 and event processing software 1106 that are accessible to and/or are operated on by the one or more processors 1103.

In another aspect, the computer 1101 can also comprise other removable/non-removable, volatile/non-volatile computer storage media. The mass storage device 1104 can provide non-volatile storage of computer code, computer readable instructions, data structures, program modules, and other data for the computer 1101. For example, a mass storage device 1104 can be a hard disk, a removable magnetic disk, a removable optical disk, magnetic cassettes or other magnetic storage devices, flash memory cards, CD- ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1104, including by way of example, an operating system 1105 and event processing software 1106. One or more of the operating system 1105 and event processing software 1106 (or some combination thereof) can comprise elements of the programming and the event processing software 1106. Equipment data 1107 can also be stored on the mass storage device 1104. Equipment data 1107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple locations within the network 1115.

In another aspect, a user can enter commands and information into the computer 1101 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices can be connected to the one or more processors 1103 via a human machine interface 1102 that is coupled to the bus 1113, but can be connected by other interface and bus structures, such as a parallel port, game port, an IEEE 1394 Port (also known as a Firewire port), a serial port, network adapter 1108, and/or a universal serial bus (USB).

In yet another aspect, a display device 1111 can also be connected to the bus 1113 via an interface, such as a display adapter 1109. It is contemplated that the computer 1101 can have more than one display adapter 1109 and the computer 1101 can have more than one display device 1111. For example, a display device 1111 can be a monitor, an LCD (Liquid Crystal Display), light emitting diode (LED) display, television, smart lens, smart glass, and/or a projector. In addition to the display device 1111, other output peripheral devices can comprise components such as speakers (not shown) and a printer (not shown) which can be connected to the computer 1101 via Input/Output Interface 1110. Any step and/or result of the methods can be output in any form to an output device. Such output can be any form of visual representation, including, but not limited to, textual, graphical, animation, audio, tactile, and the like. The display 1111 and computer 1101 can be part of one device, or separate devices.

In an aspect, the computer 1101 can be coupled to the system 200 via the Input/Output Interface 1110. The computer 1101 can be configured to control, monitor, and store data related to equipment operation, such as a chromatography process. The computer 1101 allows an operator to upload, edit, and/or run the disclosed methods, control the operation of the disclosed methods, monitor column performance, and store data.

The computer 1101 can operate in a networked environment using logical connections to one or more remote computing devices 1114*a,b,c*. By way of example, a remote computing device 1114*a,b,c* can be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 1101 and a remote computing device 1114*a,b,c* can be made via a network 1115, such as a local area network (LAN) and/or a general wide area network (WAN). Such network connections can be through a network adapter 1108. A network adapter 1108 can be implemented in both wired and wireless environments. Such networking environments are conventional and commonplace in dwellings, offices, enterprise-wide computer networks, intranets, and the Internet.

For purposes of illustration, application programs and other executable program components such as the operating system 1105 are illustrated herein as discrete blocks, although it is recognized that such programs and components can reside at various times in different storage components of the computing device 1101, and are executed by the one or more processors 1103 of the computer 1101. An implementation of event processing software 1106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms, Monte Carlo algorithms, molecular dynamics algorithms), machine learning algorithms (e.g. SVM), swarm intelligence (e.g. ant algorithms), and hybrid intelligent systems (e.g. Expert inference rules generated through a neural network or production rules from statistical learning).

FIG. 20 illustrates an example user interface 2000. The user interface 2000 is a profile edit/generate screen. The parameters selected in profile creation can be used to adjust the analysis based on unique characteristics and to optimize the robustness of the output for each column and program. Parameters listed in the example user interface 2000 are illustrative and not a comprehensive list of parameters that can be used with the methods and systems disclosed.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving equipment data from a piece of equipment, wherein the equipment data comprises a data file comprising one or more data entries;
   storing the data file in a file storage location;
   monitoring, based on a profile, the file storage location for data file activity, wherein the profile defines at least one of: one or more file storage locations to monitor, one or more types of data files to monitor, one or more types of data entries within a data file to monitor, or a message type;
   processing, based on data file activity in the monitored file storage location, the data file according to the profile;
   determining, based on the processed data file and the profile, at least one of: an error code, an operating parameter, or a sample parameter associated with at least one of: a biomolecule, a pharmaceutical, or a bioprocess;
   generating, based on the processed data file and the at least one of the error code, the operating parameter, or the sample parameter associated with the at least one of: the biomolecule, the pharmaceutical, or the bioprocess, a message according to the profile; and
   transmitting the message.

2. The method of claim 1, wherein receiving equipment data from the piece of equipment comprises monitoring a network file storage location for a data file or directly retrieving the equipment data from the piece of equipment.

3. The method of claim 1, wherein storing the data file in a file storage location comprises:
   determining, based on the equipment data, a type of the piece of equipment;
   determining the monitored file storage location associated with the type of the piece of equipment; and
   storing the data file in the monitored file storage location associated with the type of the piece of equipment.

4. The method of claim 1, wherein monitoring, based on the profile, the file storage location for data file activity, comprises determining one or more of storage of a new data file or modification of an existing data file.

5. The method of claim 1, wherein the one or more types of data files to monitor comprise one or more of a spreadsheet, a text file, a database, a log file, a resource file, a backup file, or a file type specific to an operating system of the piece of equipment.

6. The method of claim 1, wherein the one or more types of data indicate one or more of alarms, alarm acknowledgement, messages, run start, run end, run pause, or unresponsive equipment.

7. The method of claim 1, wherein the message type comprises one or more of a user interface on a computing device coupled to the one or more pieces of equipment, an electronic mail (e-mail), a Short Message Service (SMS), a social media message, a data message, a page of a pager, or a phone call.

8. The method of claim 1, wherein processing, based on data file activity in the monitored file storage location, the data file according to the profile comprises:
   determining that the data file comprises a type that matches the profile; and
   determining that the data file comprises a data entry that matches the profile.

9. The method of claim 1, wherein processing, based on data file activity in the monitored file storage location, the data file according to the profile comprises:
   determining that the data file comprises chromatography data;
   performing a transition analysis on the chromatography data to generate transition data representing a column integrity of a chromatography process skid.

10. The method of claim 1, wherein generating, based on the processed data file, a message according to the profile comprises:
    determining, based on the message type, message content; and
    determining, based on the message type, a message recipient.

11. The method of claim 1, wherein transmitting the message comprises:
    determining, based on the message type, a message service; and
    providing the message to the message service for transmission.

12. The method of claim 1, further comprising terminating, based on processing the data file, a process on the piece of equipment.

13. A system comprising:
    a piece of equipment, configured for generating equipment data; and
    a computing device, coupled to the piece of equipment, configured for:
      receiving equipment data from the piece of equipment, wherein the equipment data comprises a data file comprising one or more data entries;
      storing the data file in a file storage location;
      monitoring, based on a profile, the file storage location for data file activity, wherein the profile defines at least one of: one or more file storage locations to monitor, one or more types of data files to monitor, one or more types of data entries within a data file to monitor, or a message type;
      processing, based on data file activity in the monitored file storage location, the data file according to the profile;
      determining, based on the processed data file and the profile, at least one of: an error code, an operating parameter, or a sample parameter associated with at least one of: a biomolecule, a pharmaceutical, or a bioprocess,
      generating, based on the processed data file and the at least one of: the error code, the operating parameter, or the sample parameter associated with the at least one of: the biomolecule, the pharmaceutical, or the bioprocess, a message according to the profile; and
      transmitting the message.

14. The system of claim 13, wherein the computing device configured for receiving equipment data from the piece of equipment comprises the computing device being configured for monitoring a network file storage location for a data file or directly retrieving the equipment data from the piece of equipment.

15. The system of claim 13, wherein the computing device configured for storing the data file in a file storage location comprises the computing device configured for:
determining, based on the equipment data, a type of the piece of equipment;
determining the monitored file storage location associated with the type of the piece of equipment; and
storing the data file in the monitored file storage location associated with the type of the piece of equipment.

16. The system of claim 13, wherein the computing device configured for monitoring, based on the profile, the file storage location for data file activity, comprises the computing device configured for determining one or more of: storage of a new data file or modification of an existing data file.

17. The system of claim 13, wherein the computing device configured for processing, based on data file activity in the monitored file storage location, the data file according to the profile comprises the computing device configured for:
determining that the data file comprises a type that matches the profile; and
determining that the data file comprises a data entry that matches the profile.

18. The system of claim 13, wherein the computing device configured for generating, based on the processed data file, a message according to the profile comprises the computing device configured for:
determining, based on the message type, message content; and
determining, based on the message type, a message recipient.

19. The system of claim 13, wherein the computing device configured for transmitting the message comprises the computing device configured for:
determining, based on the message type, a message service; and
providing the message to the message service for transmission.

20. The system of claim 13, wherein the computing device is further configured for terminating, based on the computing device being configured for: processing the data file, a process on the piece of equipment.

* * * * *